(12) United States Patent
Nguyen

(10) Patent No.: US 11,454,734 B2
(45) Date of Patent: Sep. 27, 2022

(54) AUTOMATED EXTRACTION OF HORIZON PATCHES FROM SEISMIC DATA

(71) Applicant: LANDMARK GRAPHICS CORPORATION, Houston, TX (US)

(72) Inventor: Xuan Nam Nguyen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 75 days.

(21) Appl. No.: 17/028,735

(22) Filed: Sep. 22, 2020

(65) Prior Publication Data

US 2022/0091292 A1    Mar. 24, 2022

(51) Int. Cl.
*G01V 1/30*    (2006.01)

(52) U.S. Cl.
CPC .......... *G01V 1/307* (2013.01); *G01V 2210/20* (2013.01); *G01V 2210/63* (2013.01)

(58) Field of Classification Search
CPC . G01V 1/307; G01V 2210/20; G01V 2210/63
See application file for complete search history.

(56) References Cited

U.S. PATENT DOCUMENTS

| 5,153,858 A | 10/1992 | Hildebrand | |
|---|---|---|---|
| 5,570,106 A * | 10/1996 | Viswanathan | G01V 1/301 367/72 |
| 5,646,342 A * | 7/1997 | Hagenes | G01V 1/30 73/152.58 |
| 6,865,521 B1 * | 3/2005 | Padgett | G01V 1/30 703/2 |
| 8,065,088 B2 | 11/2011 | Dorn et al. | |
| 8,219,322 B2 | 7/2012 | Monsen et al. | |
| 8,566,069 B2 | 10/2013 | Pauget et al. | |
| 8,688,757 B2 | 4/2014 | Wagner et al. | |
| 9,182,511 B2 | 11/2015 | Neave | |
| 9,759,826 B2 | 9/2017 | Mallet et al. | |
| 2004/0054478 A1 * | 3/2004 | Brygynevych | G01V 1/40 702/14 |

(Continued)

FOREIGN PATENT DOCUMENTS

WO    2011062807 A1    5/2011

OTHER PUBLICATIONS

International Search report and Written Opinion, PCT Application No. PCT/US2020/053108, dated Jun. 15, 2021.

*Primary Examiner* — Mohammad K Islam
(74) *Attorney, Agent, or Firm* — Polsinelli PC

(57) ABSTRACT

Systems and methods are provided for a horizon patch extraction process and in particular, to receiving seismic trace data of a plurality of seismic events of a subterranean volume, selecting a first seismic trace based on the seismic trace data of the plurality of seismic events, the first seismic trace including a plurality of seismic onsets, determining a depth, an amplitude, and a first thickness of a first seismic onset of the first seismic trace, determining a second thickness between the first seismic onset and a second seismic onset, determining a third thickness between the first seismic onset and a third seismic onset, and generating a horizon patch based on the depth, the amplitude, and the first thickness of the first seismic onset, the second thickness between the first seismic onset and the second seismic onset, and the third thickness between the first seismic onset and the third seismic onset.

17 Claims, 16 Drawing Sheets

(56) References Cited

U.S. PATENT DOCUMENTS

| | | | |
|---|---|---|---|
| 2004/0260476 A1* | 12/2004 | Borgos | G01V 1/301 |
| | | | 702/14 |
| 2011/0002194 A1* | 1/2011 | Imhof | G01V 1/32 |
| | | | 367/53 |
| 2012/0029828 A1 | 2/2012 | Pepper et al. | |
| 2013/0054147 A1* | 2/2013 | Diller | G01V 1/288 |
| | | | 702/14 |
| 2013/0151161 A1* | 6/2013 | Imhof | G01V 1/301 |
| | | | 702/14 |
| 2013/0226968 A1* | 8/2013 | Wagner | G01V 1/30 |
| | | | 707/776 |
| 2013/0262052 A1 | 10/2013 | Mallet et al. | |
| 2014/0126781 A1* | 5/2014 | Poole | G06V 20/13 |
| | | | 382/109 |
| 2014/0163890 A1 | 6/2014 | Leahy | |
| 2016/0209530 A1* | 7/2016 | Nguyen | G01V 1/30 |
| 2021/0149066 A1* | 5/2021 | Wu | G01V 1/005 |

* cited by examiner

AUTOMATED EXTRACTION OF HORIZON PATCHES FROM SEISMIC DATA

TECHNICAL FIELD

The present technology pertains to seismic data and in particular, to extracting horizon patches from the seismic data.

BACKGROUND

Seismic surveys are used in the oil and gas industry for exploring the subsurface geology of the earth. Seismic waves are generated that travel below the surface of the earth, reflect off subterranean structures and return to the surface where they are detected by sensors. Data from the sensors is then used to determine the location of various subsurface features that may trap oil, such as faults or folds in the rock. The data from the sensors is processed to produce 3D volume data sets of seismic traces. The volumes include a seismic attribute value at specified (x,y,z) locations within a geographic space.

Traditionally, seismic interpreters manually select a small number of seismic events to pick as horizons in a volume. The manual interpretations of individual seismic events or horizons can extend throughout a seismic volume using waveform auto-tracking techniques.

While traditional auto-tracking techniques of extending previous selections have proven to be suitable for traditional subsurface mapping and trap definition workflows. However, it is inadequate and time consuming for more advanced workflows such as reservoir characterization and stratigraphic studies, where a large number (e.g., 100s) of seismic events per volume per trace have to be consistently interpreted.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
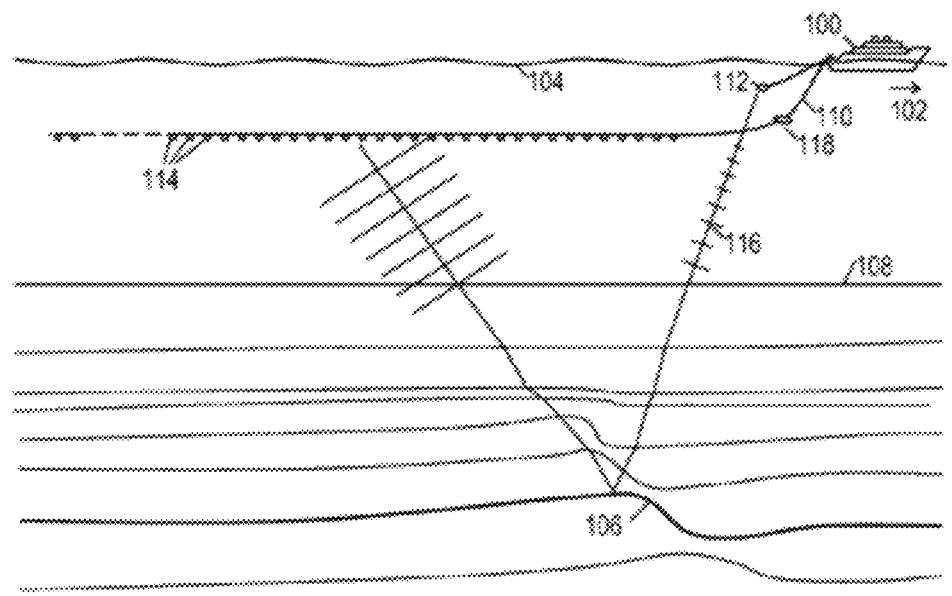
FIG. 1A illustrates a side view of an example marine seismic survey environment, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed are systems and methods for extracting horizon patches from the seismic data.

According to at least one aspect, an example method for extracting horizon patches is provided. The method can include receiving seismic trace data of a plurality of seismic events of a subterranean volume. The method can further include selecting a first seismic trace based on the seismic trace data of the plurality of seismic events, the first seismic trace including a plurality of seismic onsets. Also, the method can include determining a depth, an amplitude, and a first thickness of a first seismic onset of the first seismic trace. Furthermore, the method can include determining a second thickness between the first seismic onset and a second seismic onset. Moreover, the method can include determining a third thickness between the first seismic onset and a third seismic onset. The method can also include generating a horizon patch based on the depth, the amplitude, and the first thickness of the first seismic onset, the second thickness between the first seismic onset and the second seismic onset, and the third thickness between the first seismic onset and the third seismic onset.

According to at least another aspect, an example system for extracting horizon patches is provided. The system can include one or more processors; and at least one computer-readable storage medium having stored therein instructions which, when executed by the one or more processors, cause the system to receive seismic trace data of a plurality of seismic events of a subterranean volume. The instructions can further cause the system to select a first seismic trace based on the seismic trace data of the plurality of seismic events, the first seismic trace including a plurality of seismic onsets. The instructions can also cause the system to determine a depth, an amplitude, and a first thickness of a first seismic onset of the first seismic trace. Furthermore, the instructions can cause the system to determine a second thickness between the first seismic onset and a second seismic onset. Moreover, the instructions can cause the system to determine a third thickness between the first seismic onset and a third seismic onset. The instructions can also cause the system to generate a horizon patch based on the depth, the amplitude, and the first thickness of the first seismic onset, the second thickness between the first seismic onset and the second seismic onset, and the third thickness between the first seismic onset and the third seismic onset.

According to at least yet another aspect, an example non-transitory computer-readable storage medium for extracting horizon patches is provided. The non-transitory computer-readable storage medium can include instructions stored on the non-transitory computer-readable storage medium, the instructions, when executed by one or more processors, cause the one or more processors to receive seismic trace data of a plurality of seismic events of a subterranean volume. The instructions can further cause the one or more processors to select a first seismic trace based on the seismic trace data of the plurality of seismic events, the first seismic trace including a plurality of seismic onsets. Furthermore, the instructions can cause the one or more processors to determine a depth, an amplitude, and a first thickness of a first seismic onset of the first seismic trace. Moreover, the instructions can cause the one or more processors to determine a second thickness between the first seismic onset and a second seismic onset. Also, the instructions can cause the one or more processors to determine a third thickness between the first seismic onset and a third seismic onset. The instructions can also cause the one or more processors to generate a horizon patch based on the depth, the amplitude, and the first thickness of the first seismic onset, the second thickness between the first seismic onset and the second seismic onset, and the third thickness between the first seismic onset and the third seismic onset.

Figure 11:
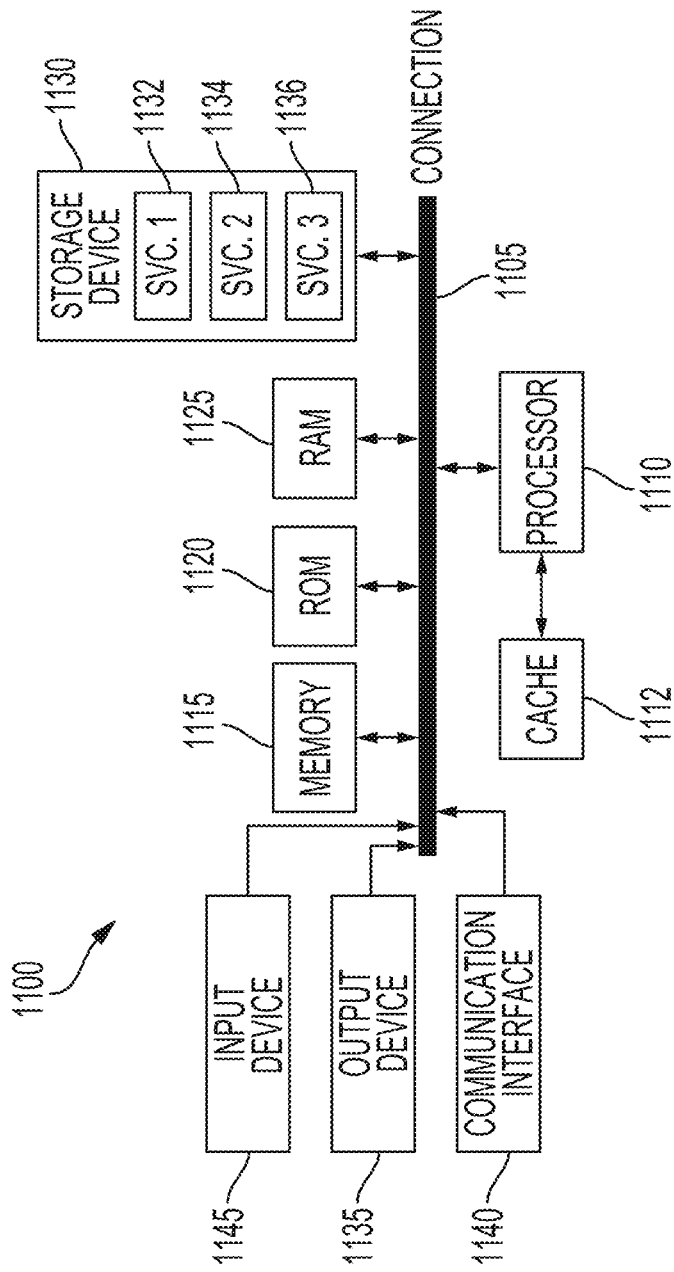
FIG. 11 illustrates a schematic diagram of an example computing device architecture, in accordance with various aspects of the subject technology.

As follows, the disclosure will provide a more detailed description of the systems and methods and techniques herein for extracting horizon patches. The disclosure includes example systems, environments, methods, and technologies for extracting horizon patches. The disclosure concludes with a description of an example computing system architecture, as shown in FIG. 11, which can be implemented for performing computing operations and functions disclosed herein. These variations shall be described herein as the various embodiments are set forth.

Figure 1B:
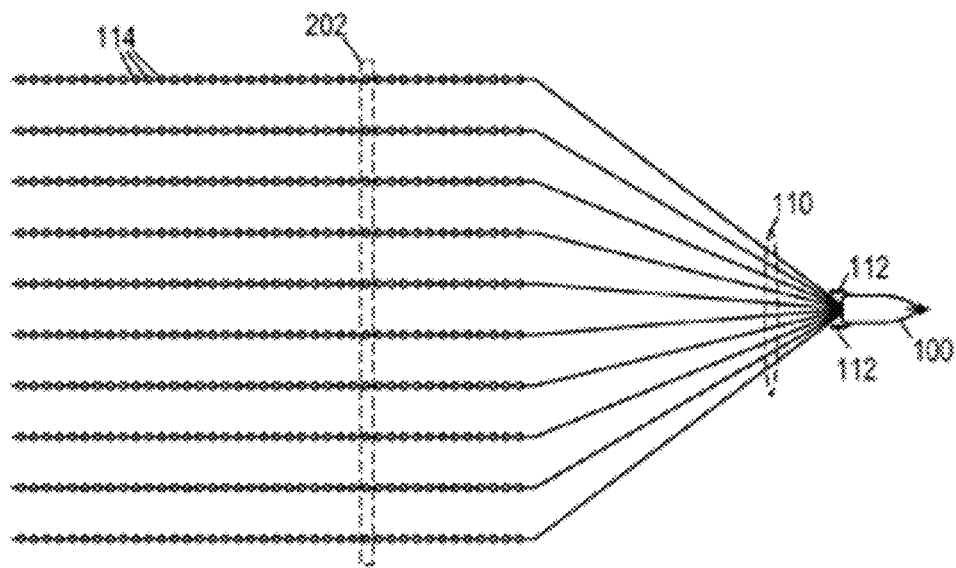
FIG. 1B illustrates a top view of an example marine seismic survey environment, in accordance with various aspects of the subject technology.

These and other inventive aspects of the present disclosure are shown in an illustrative context such as a marine seismic survey such as that shown in FIGS. 1A and 1B. At sea, seismic survey ships deploy streamers behind a ship as shown in FIG. 1A. Each streamer 110 trails behind the ship 100 as the ship moves forward (e.g., in the direction of arrow 102), and each streamer includes multiple evenly-spaced receivers 114. Each streamer 110 may further include a programmable diverter 118 and programmable depth controllers that pull the streamer out to an operating offset distance from the ship's path (as shown in FIG. 1B) and down to a desired operating depth (FIG. 1A). FIG. 1B illustrates an overhead view of the seismic survey ship 100 towing a set of streamers 110 and two sources 112. As the ship 100 moves forward, the sources can be triggered alternately in a so-called flip-flop pattern. The receivers at a given position on the streamers are associated with a common field file trace number or common channel 202. Streamers 110 may be up to several kilometers long, and are usually constructed in sections 25 to 100 meters in length that include groups of up to 35 or more uniformly spaced receivers. Each streamer 110 includes electrical or fiber-optic cabling for interconnecting receivers 114 and the seismic equipment on ship 100. Data is digitized near the receivers 114 and transmitted to the ship 100 through the cabling at rates of 7 (or more) million bits of data per second.

As shown in FIG. 1A, seismic survey ship 100 can also tow one or more sources 112. Source 112 may be an impulse source or a vibratory source. The receivers 114 used in marine seismology are commonly referred to as hydrophones, and are usually constructed using a piezoelectric transducer. Various suitable types of hydrophones are available such as disk hydrophones and cylindrical hydrophones. Sources 112 and receivers 114 typically deploy below the ocean's surface 104. Processing equipment aboard the ship controls the operation of the sources and receivers and records the acquired data.

Seismic surveys provide data for imaging below the ocean surface 104 to reveal subsurface structures such as structure 106, which lies below the ocean floor 108. Analysts can employ seismic imaging methods to process the data and map the topography of the subsurface layers. Seismic survey data also reveals various other characteristics of the subsurface layers which can be used to determine the locations of oil and/or gas reservoirs. To image the subsurface structure 106, source 112 emits seismic waves 116 that are reflected where there are changes in acoustic impedance due to subsurface structure 106 (and other subsurface reflectors). The reflected waves are detected by a pattern of receivers 114. By recording (as a function of time) the arriving seismic waves 116 that have traveled from source 112 to subsurface structure 106 to receivers 114, an image of subsurface structure 106 can be obtained after appropriate data processing. Of course, it will be understood by those of skill in the art that even though embodiments are described in connection with off-shore seismic technology, other embodiments are useful with on-shore, ocean bottom or other seismic survey arrangements.

Regarding data science, network analysis is the study of graphs as a representation of either symmetric or asymmetric relations between discrete objects. As described herein, a system and method is provided for applying network analysis techniques to seismic trace data to automatically extract horizon patches at each seismic event throughout a volume. The system and method can also enable parallel-processing capabilities for faster processing times of larger seismic datasets using cloud-computing infrastructure. In some instances, the system and method can empower the seismic interpreter to not only accomplish full-volume subsurface structural mapping in a shorter period of time, but the system and method can also effectively interpret multiple reservoir zones and quantitatively inspect changes in seismic amplitudes due to stratigraphic, lithology, and fluid variation.

Figure 2:
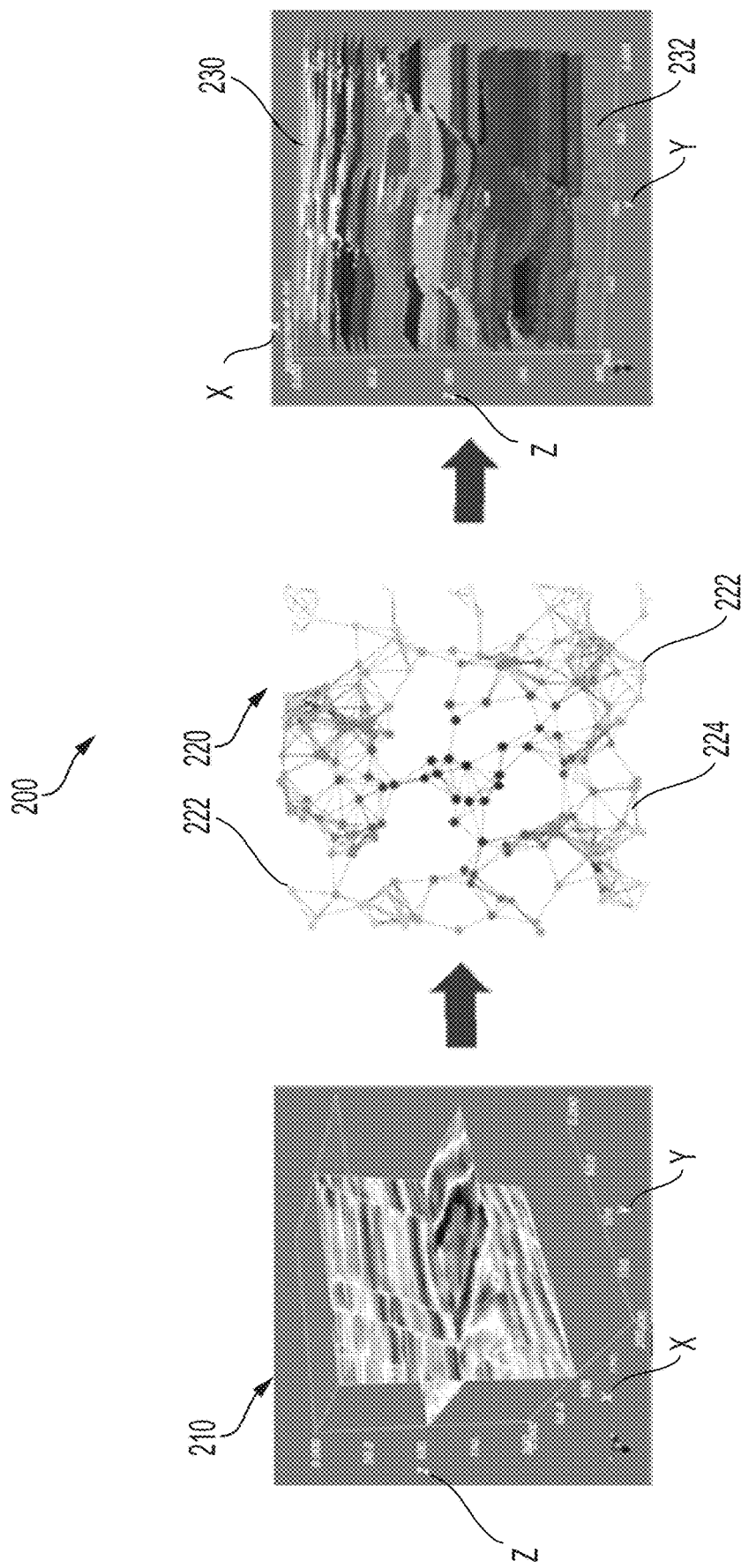
FIG. 2 illustrates diagrams of an example system for generating horizon patches, in accordance with various aspects of the subject technology.

FIG. 2 illustrates diagrams of an example system 200 for generating horizon patches, in accordance with various aspects of the subject technology. By applying a data science technique 220, such as network analysis 220 to seismic traces, horizon patches 230, 232 can be automatically extracted at every seismic event 210 throughout an entire seismic volume (e.g., subterranean volume such as a salt body). Horizon patch system 200 not only accomplishes subsurface structural mapping studies in a short period of time (e.g., hours), instead of weeks or months, but also quickly analyzes multiple reservoir zones and quantitatively determines changes to seismic amplitudes due to stratigraphic, lithology, and fluid changes.

Figure 5:
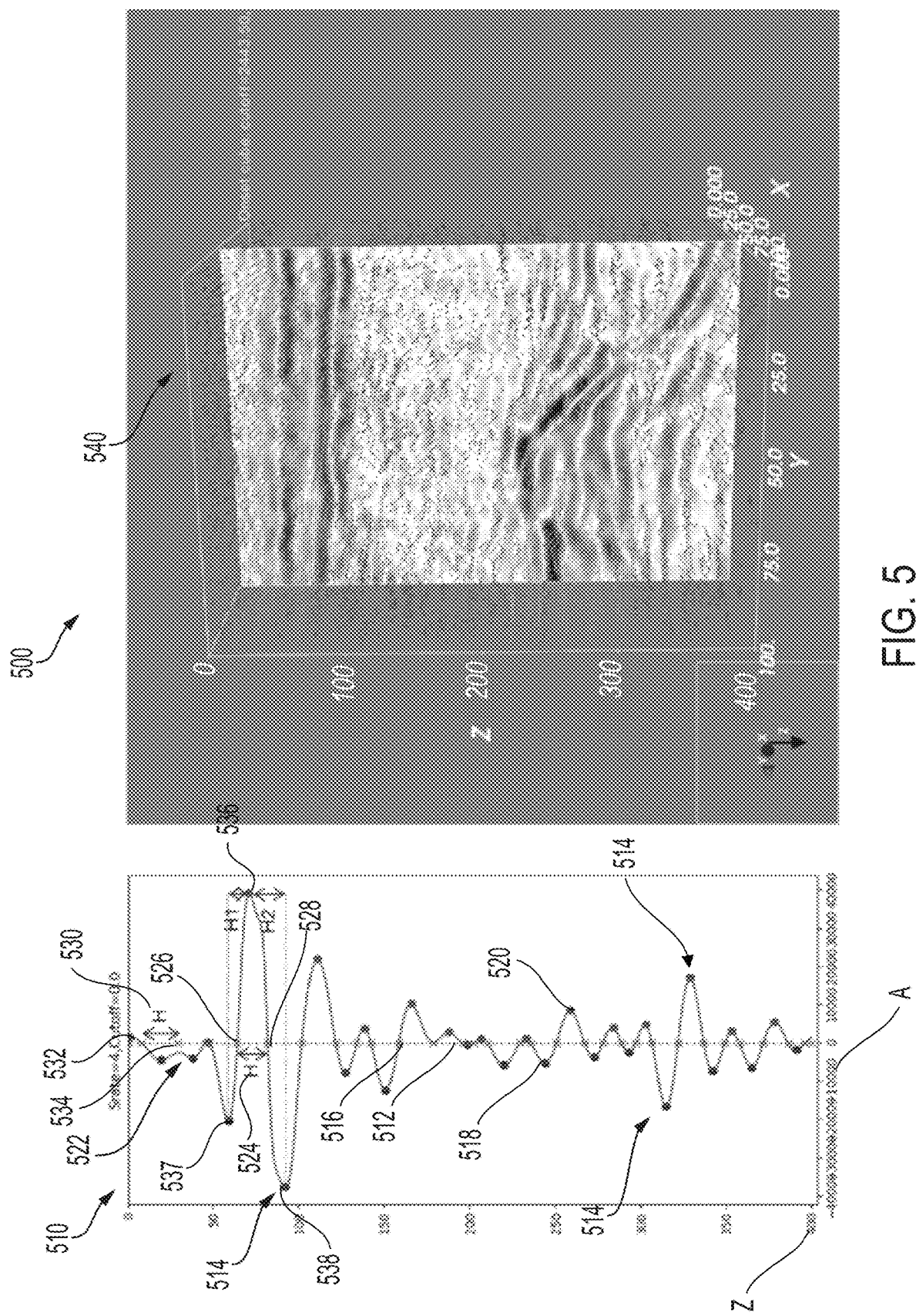
FIG. 5 illustrates an example of onsets based on seismic traces, in accordance with various aspects of the subject technology.

Horizon patch system 200 can include the following features and processes:

1) A set of new thickness attributes (H, H1, H2 as shown in FIG. 5) can be calculated in addition to the other attributes such as time/depth (Z) and amplitude (A) for each minimum and maximum seismic onset, per seismic trace, within a seismic volume. Existing systems at least fail to calculate and utilize thickness attributes (H, H1, H2) in generating horizon patches 230, 232.

2) Multi-Z horizon patches 230, 232 can be determined by connecting minimum and maximum seismic onsets that have similar attributes (e.g., H, Z, and A). Examples of multi-Z structures include, but are not limited to, reverse faults, overturned beds, salt bodies, and any other structure for which different portions of the structure intersect the same seismic trace multiple times. Existing systems assume patch horizons are only a single-Z attribute.

3) Horizon patch system 200 can also be multi-threaded, and parallel processed intensively by seismic trace and sub-volume.

In some instances, horizon patch system 200 can apply network/graph theory 220 to extract horizon patches 230, 232 with high speed and accuracy from a seismic volume. For example, networks 220 can utilize minimum and maximum seismic onsets for various seismic traces within the seismic volume. Edges 224 (e.g., minimum or maximum seismic onsets) can be connection between a pair of seismic onsets that have similar attributes (e.g., H, Z, and A) with adjacent seismic traces. The connections between seismic onsets of the adjacent seismic traces can then form connected components within the seismic volume. The connected components of the seismic onsets can form horizon patches 230, 232 through an entire seismic volume to provide a subterranean view of the various volumes of material.

Referring to FIG. 2, horizon patch system 200 can further include a data structure having:

1) Seismic onsets that can be designated as nodes 222. In some instances, seismic onsets can be generated from the seismic traces.

Figure 4:
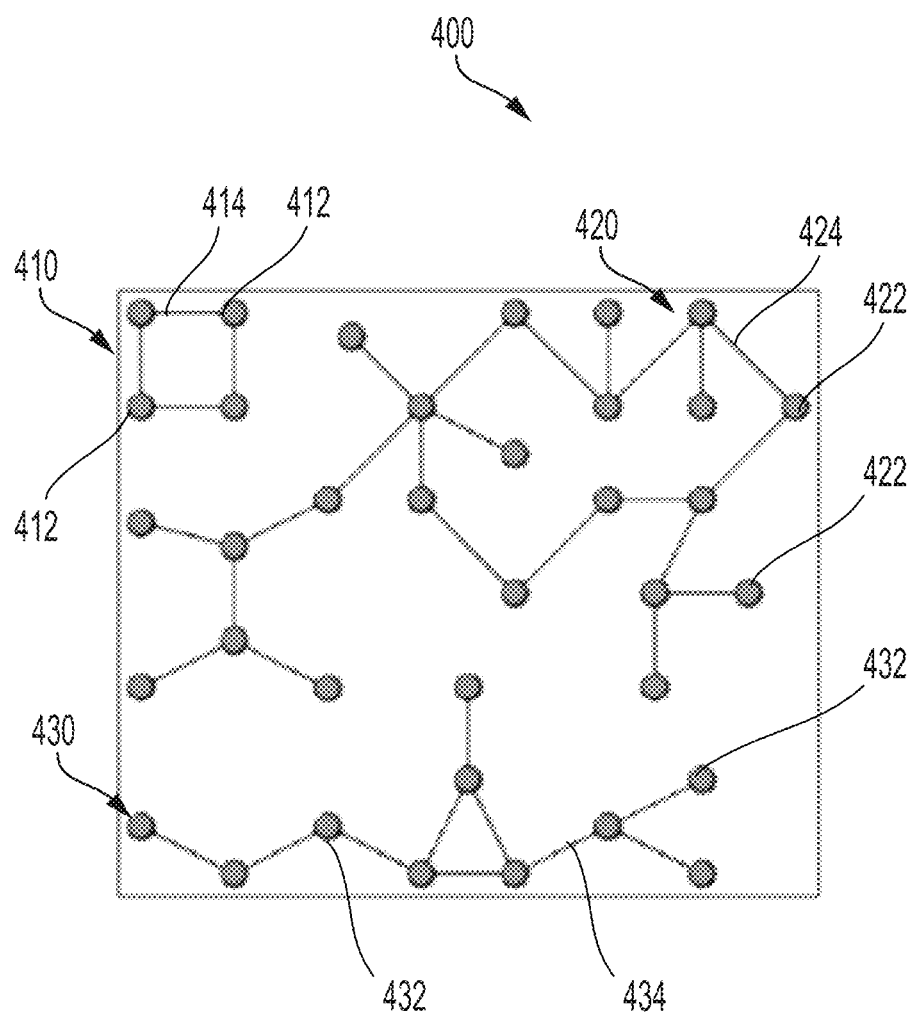
FIG. 4 illustrates an example graph with components, in accordance with various aspects of the subject technology.

2) Connection of two seismic onsets from adjacent seismic traces (e.g., via seismic onsets and nodes 222) that have similar attributes (e.g., H, Z, and A) can be designated as edges 224. In some instances, the connection of at least two seismic onsets can generate a component (e.g., components 410, 420, 430 as illustrated in FIG. 4 as provided below).

3) Horizon patches 230, 232 can be generated from the connected components 410, 420, 430 to horizon patch cubes.

FIGS. 3A-3F illustrate an example workflow 300 for generating horizon patches, in accordance with various aspects of the subject technology. Workflow 300 may include a system that can be configured to perform the steps described herein relating to workflow 300.

Figure 3A:
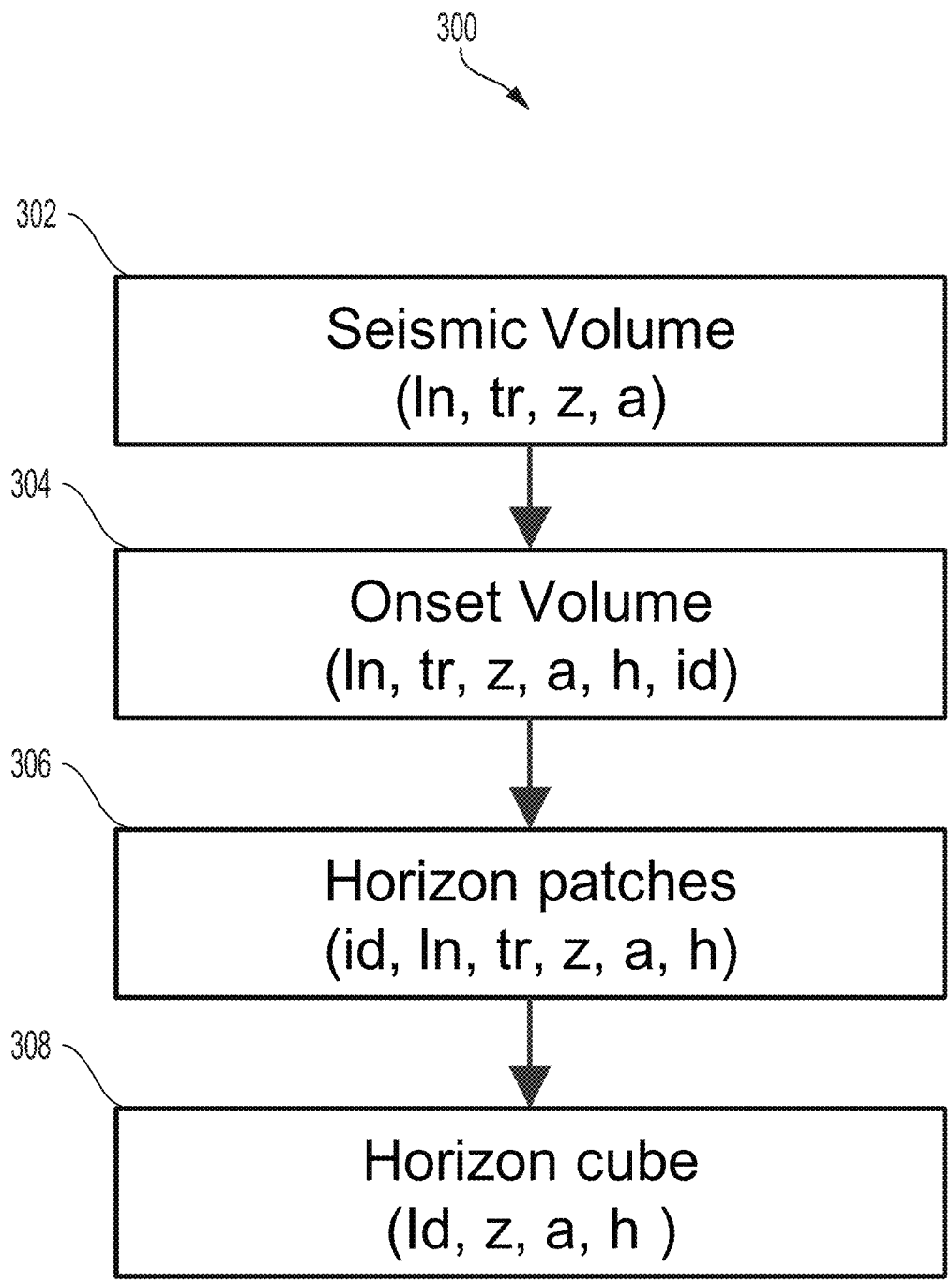
FIGS. 3A-3F illustrate an example workflow for generating horizon patches, in accordance with various aspects of the subject technology.
Figure 3B:
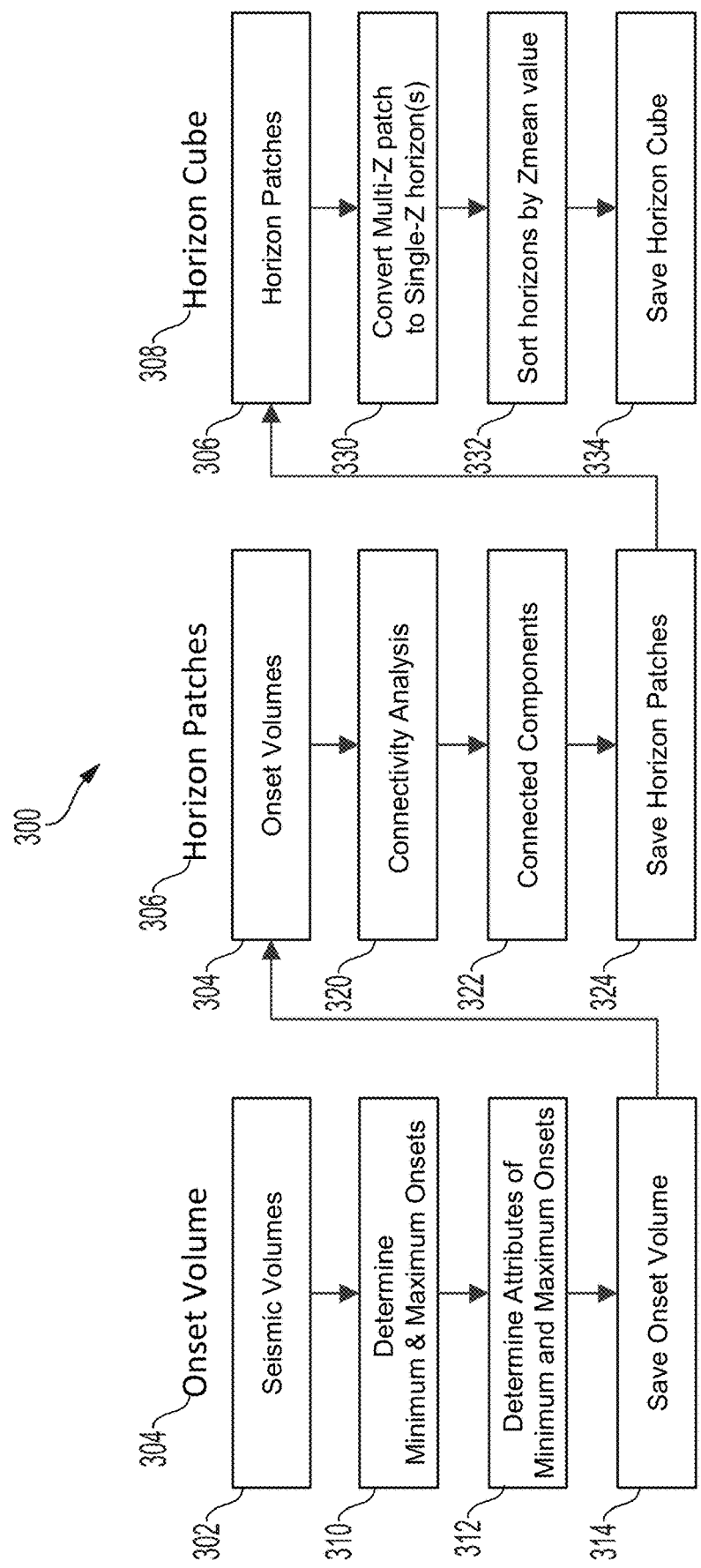

Referring to FIG. 3A, in step 302, workflow 300 can include receiving seismic input data and determining a seismic volume from a seismic event such as a line, seismic trace, time/depth Z, and amplitude A. The seismic input data can be received from one or more seismic traces at various time/depths Z and amplitudes A. The seismic input data can also be received from multiple seismic traces independently and/or simultaneously from each other.

In step 304, workflow 300 of FIG. 3A can include generating a cube (e.g., an onset volume) based on minimum and maximum onsets utilizing attributes such as line, seismic trace, time/depth Z, amplitude A, thickness H, and identity ID. Onset volume generation can also utilize parameters such as amplitude cutoff.

In some implementations, onset volume 304 of workflow 300 can be generated by receiving seismic volume data 302, determining minimum and maximum seismic onsets 310 (e.g., as further described in FIG. 5) based on seismic volume data 302, and determining attributes of minimum and maximum seismic onsets 312 (e.g., as further described in FIG. 5). Workflow 300 can further include storing onset volume 314 generated by workflow 300 locally or at a cloud-based source that can be utilized at various steps of workflow 300.

Onset volume 304 can transform seismic traces into an accurate data representations that can be more suitable for applying data science analyses. For example, each seismic trace can be represented as a set of the minimum and maximum onsets 310 based on seismic volume data 302 such as time/depth Z, amplitude A, and thickness H measurements.

In step 306, workflow 300 of FIG. 3A can include evaluating connectivity of nodes and edges of onsets between adjacent seismic traces to generate connected components that can then be utilized to generate seismic horizon patches. In some instances, connectivity analysis can utilize parameters such as identity ID, line, trace, time/depth Z, amplitude A, and thickness H.

In some implementations, horizon patches 306 of workflow 300 can be generated by receiving onset volume data 304, analyzing connectivity 320 (as described herein) based on onset volume data 304, and determining connected components 322 (as described herein). Workflow 300 can further include storing horizon patches 324 generated by workflow 300 locally or at a cloud-based source that can be utilized at various steps of workflow 300.

In some instances, horizon patch 306 of workflow 400 can be generated by analyzing each trace of each seismic onset to determine whether an onset can be connected to another onset from neighbor traces by comparing respective Z, A, H attributes. In other instances, two seismic onsets can be connected if the difference between their respective attributes (e.g., time Z, amplitude A, and thickness H) satisfy predetermined values such as Z_sc=5-11, A_sc=0.5-0.9, and H_sc=0.5-0.9. The predetermined values can also be set as user defined values. The outcome of the connectivity analysis can include a list of connected onset pairs that can be utilized as inputs for horizon patch 306 generation. For example, if A connects to B and B connects to C, then A, B, and C can belong to the same horizon patch 306. Connectivity analysis 320 can also be distributed into smaller subsets as each trace can be processed independently or co-dependently. Regardless of which distributed scheme is selected, the connections between two seismic onsets and subsequent horizon patches 306 can be identified consistently.

In step 308, workflow 300 of FIG. 3A can include combining horizon patches, which can be ordered by time/depth Z, to form a horizon cube output. In some instances, the horizon cube can be generated utilizing identity ID, time/depth Z, amplitude A, and thickness H.

In some implementations, horizon cube 308 of workflow 300 can be generated by receiving horizon patch data 306, converting multi-Z horizon patches to single-Z horizon patches 330 (as described herein) based on horizon patch data 306, and sorting the single-Z horizon patches 330 by Zmean values 332 (e.g., Zmean can be a mean value average of horizon patch Z data as described herein). Workflow 300 can further include storing horizon cubes 308 generated by workflow 300 locally or at a cloud-based source that can be utilized at various steps of workflow 300.

Horizon cube 308 can include a plurality of horizon patches 306 in a logical order. For example, horizon patches 308 can be sorted by Z mean values 332. Horizon cube 308 can also provide a more effective visualization and a correlation from different views in interpretation software. In some instances, data structure of horizon cube 308 can include three attributes (e.g., Z, A, and H) with a 3D array (e.g., layer_id, line, and trace). A multi-Z horizon patch 330 can also be converted into multiple layers to store in horizon cube data structure 308. Horizon cube 308 can further be displayed as a 3D cube (e.g., 800 of FIG. 8) or a 2D section with map views (e.g., 820 of FIG. 8). Thereafter, further refinement of horizon cube 308 can be performed interactively using multi-Z horizon layer's manipulation tools such as delete, merge, and re-assignment.

Figure 3C:
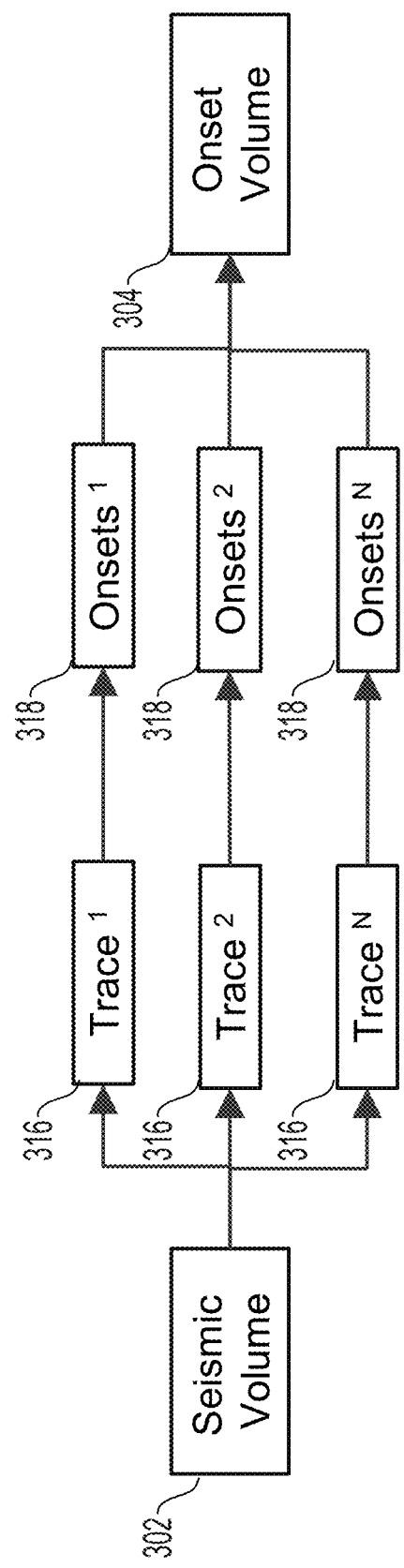
Figure 3D:
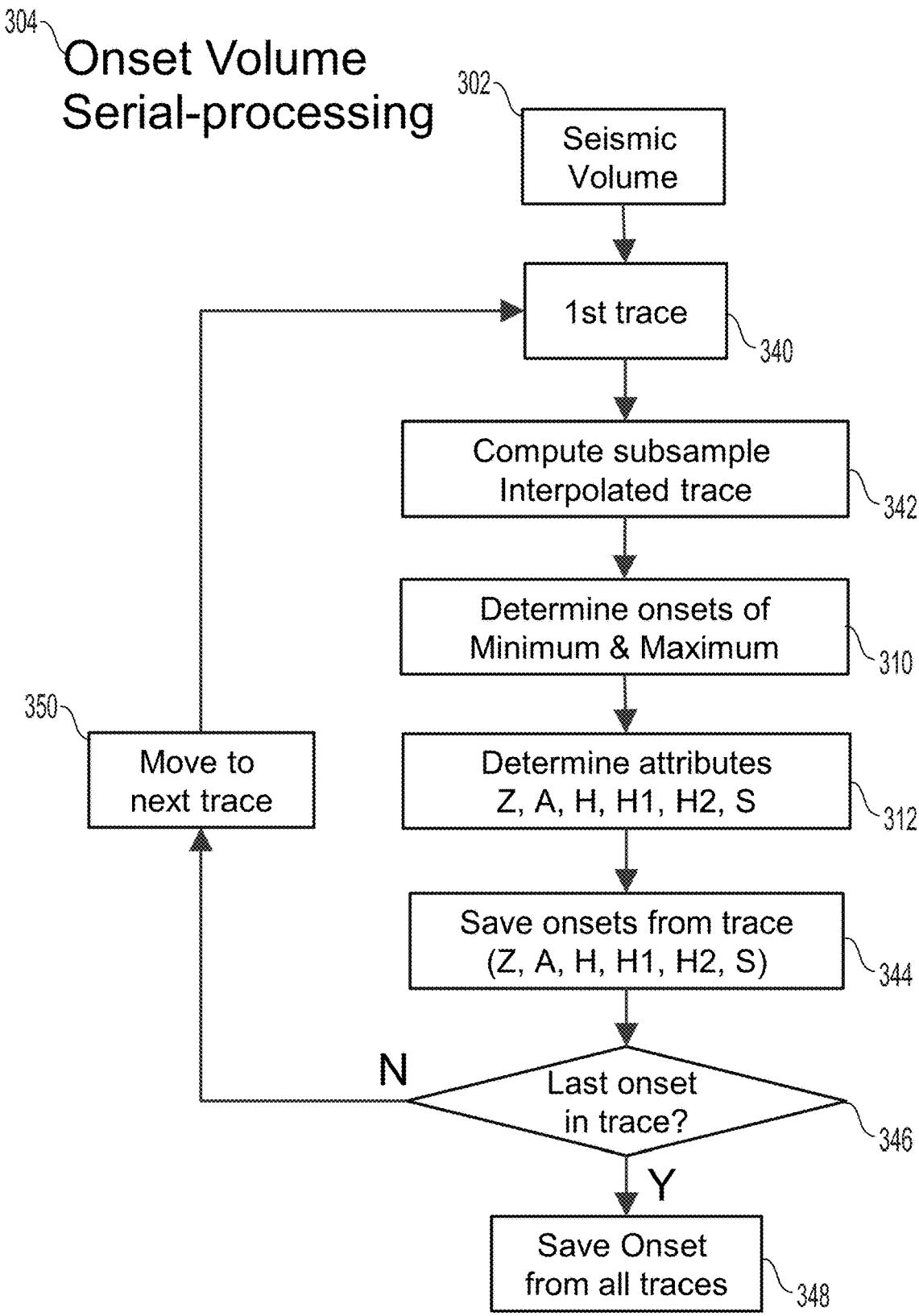

Referring to FIGS. 3C and 3D, onset volume 304 of workflow 300 can process (e.g., 310, 312) seismic volume data 302 in parallel (e.g., FIG. 3C) or in series (e.g., FIG. 3D). In FIG. 3C, each individual trace 316 (e.g., trace 1, trace 2, trace N, etc.) can be processed in parallel to generate corresponding onsets 318 (e.g., onset 1, onset 2, onset n, etc.) that can be utilized by workflow 300, which can then be further processed individually or as a whole to form onset volume 304. In FIG. 3D, onset volume 304 of workflow 300 can process (e.g., 310, 312) seismic volume data 302 in series. For example, a first trace 340 can be obtained from seismic volume 302. Workflow 300 can then compute a subsample interpolated trace 342 based on first trace 340. Thereafter, onsets of minimum and maximum 310 can be determined based on subsample interpolated trace 342. From minimum and maximum onsets 310, workflow 300 can determine attributes 312 of minimum and maximum onsets 310 (e.g., time/depth Z, amplitude A, thickness H, H1, H2, and/or Sign (S)). Workflow 300 can further include storing the onsets from the traces 344 (e.g., time/depth Z, amplitude A, and/or thickness H, H1, H2). At step 346 of workflow 300, if an onset is a last onset of trace 340, workflow 300 can include storing onsets from all or some of the traces 348. If can onset is not the last onset of trace 340, workflow 300 transitions to the next trace 350 of seismic volume 302.

Figure 3E:
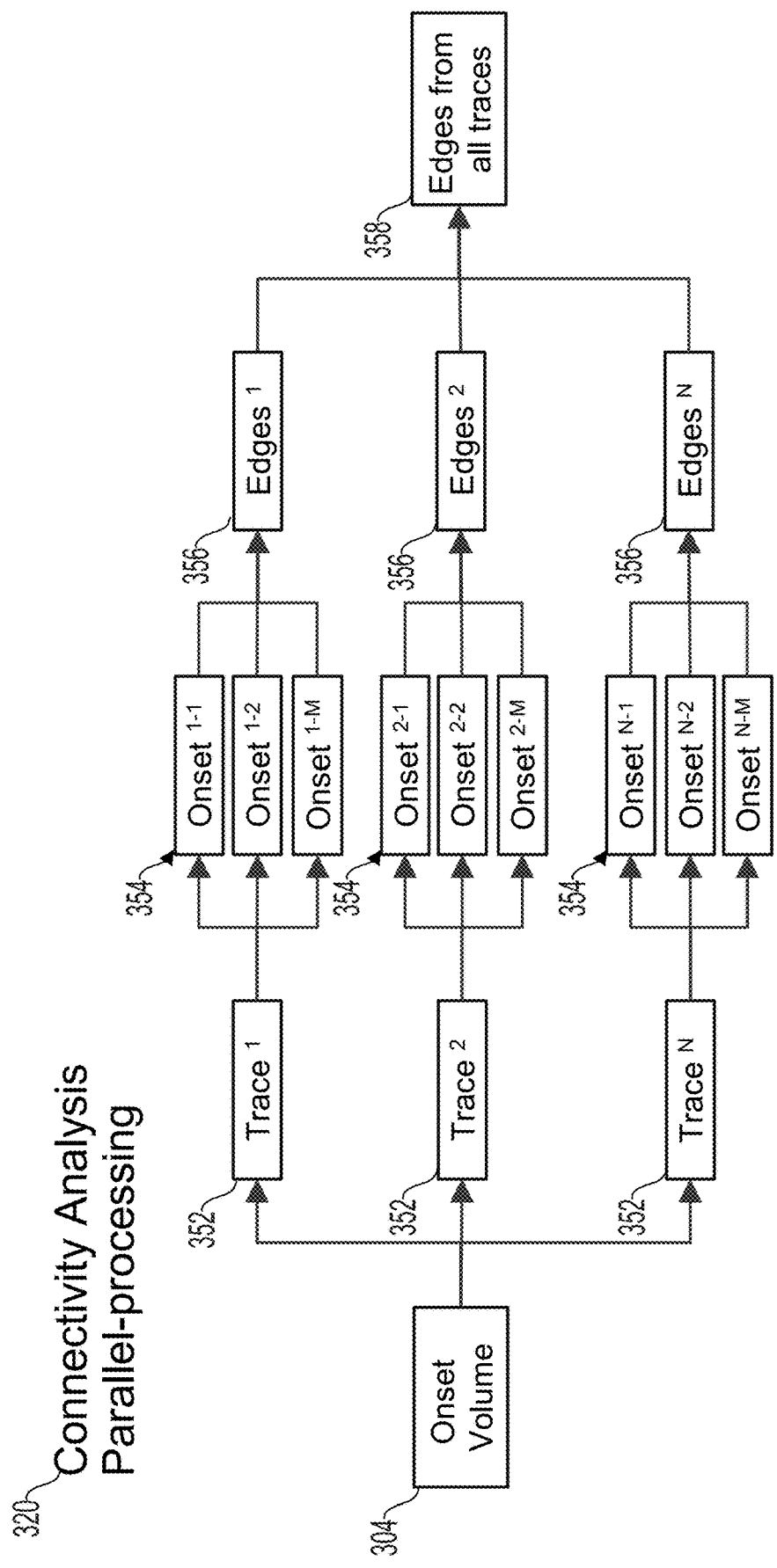
Figure 3F:
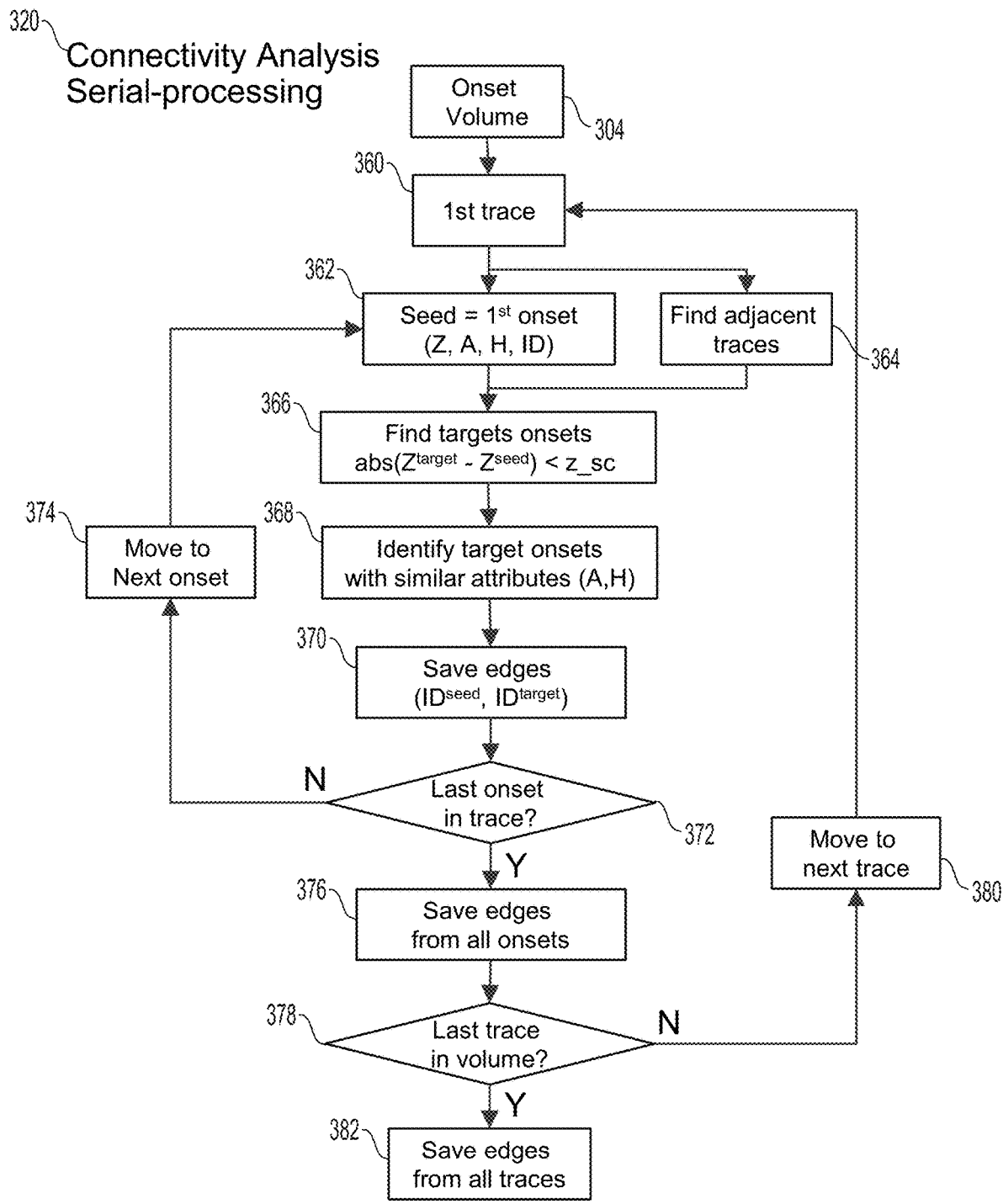

Referring to FIGS. 3E and 3F, connectivity analysis 320 of workflow 300 can process onset volume data 304 in parallel (e.g., FIG. 3E) or in series (e.g., FIG. 3F). In FIG. 3E, each individual trace 352 (e.g., trace 1, trace 2, trace n, etc.) can be processed in parallel to generate a corresponding onsets 354 (e.g., onset 1-1, onset 1-2, onset 1-M, onset 2-1, onset 2-2, onset 2-M, onset N-1, onset N-2, onset N-M, etc.) that can be utilized by workflow 300. Each onset set 354 can be processed and/or correlated individually or as a whole to form corresponding edges 356 (e.g., edges 1, edges 2, edges N, etc.). Workflow 300 can include combining edges 356 from some or all of the traces 352 of onset volume 304. The combined edges 356 can be utilized by workflow 300 to connect components 322 of onset volume 304 to form horizon patch 306.

In FIG. 3F, connectivity analysis 320 of workflow 300 can process onset volume data 304 in series. For example, a first trace 360 can be obtained from onset volume 304. Workflow 300 can further include generating a seed 362 that may be a first onset that is based on attributes time/depth Z, amplitude A, thickness H, and identity ID. In some instances, workflow 300 can include searching for adjacent traces 364 that can be utilized along with seed 362 to discover target onsets 366. An example of a parameter utilized to discover target onsets 366 include abs (Ztarget−Zseed)<z_sc. Connectivity analysis 320 of workflow 300 can further include identifying target onsets 368 with similar attributes such as amplitude A and thickness H. Once identified, edges of onsets can be stored (e.g., IDseed and IDtarget) by workflow 300. In some instances, workflow 300 can include the step 372 of determining whether the current onset is the last onset of first trace 360. If not, connectivity analysis 320 of workflow 300 can include a further step 374 of moving on to the next onset. If yes, connectivity analysis 320 of workflow 300 can proceed to store 376 edges 370 from some or all onsets of onset volume 304. In other instances, workflow 300 can include the step 378 of determining whether the current trace is the last trace of onset volume 304. If not, connectivity analysis 320 of workflow 300 can include a further step 380 of moving on to the next trace. If yes, connectivity analysis 320 of workflow 300 can proceed to store 382 edges 370 from some or all traces of onset volume 304. Edges 382 can be utilized by workflow 300 to connect components 322 of onset volume 304 to form horizon patch 306.

Network analysis is the study of graphs as a representation of either symmetric relations or asymmetric relations between discrete objects. Network analysis can be a graph having one or more "nodes" (also called vertices or points), which can be connected by "edges" (also called links or paths). In a graph, the nodes and/or edges can include attributes (e.g., names). A "component" of an undirected graph can be a subgraph in which any two vertices are connected to each other by paths, and which can be connected with no additional vertices in the graph (e.g., as shown in FIG. 4).

FIG. 4 illustrates an example graph 400 with components 410, 420, 430, in accordance with various aspects of the subject technology. For example, FIG. 4 illustrates three components 410, 420, 430. Each of components 410, 420, 430 can include nodes 412, 422, 432 and edges 414, 424, 434. The number of nodes 412, 422, 432 and edges 414, 424, 434 of components 410, 420, 430 can also vary based on the seismic event, seismic volume, etc.

FIG. 5 illustrates an example of onsets 514 based on seismic traces 510, in accordance with various aspects of the subject technology.

Onset Volume:

In some implementations, onset volumes 540 can transform seismic traces 510 into an accurate data representation 540 that can be more suitable for applying data science analyses. Onset volumes 540 can be generated similarly to onset volume 304 of workflow 300 of FIGS. 3B, 3C, and 3D. Each seismic trace 510 can be represented as a set of the minimum 518 and maximum 520 onsets 514 along with corresponding attributes such as time/depth Z, amplitude A, and thickness H measurements. In some instances, each seismic onset 514 can include the following attributes:

1) Time/depth Z. Time can be measured in milliseconds, seconds, etc. Depth can be measured utilizing imperial or metric unit of measure. For example, FIG. 5 illustrates time Z as being between 0 to 400 milliseconds (e.g., 0 milliseconds, 100 milliseconds, 200 milliseconds, 300 milliseconds, and 400 milliseconds) for seismic trace 510 and onset volume 540.

2) Amplitude A (e.g., minimum<0 and maximum>0). FIG. 5 illustrates an example of a minimum range being between 0 and −40,000 and a maximum range being between 0 and 40,000.

3) Sign (e.g., minimum=−1 and maximum=1). In some instances, if a doublet exists 522, amplitude A*Sign<0. In some instances, based on the position of the cutoff 512 (e.g., a relative 0 position), onsets (e.g., minimum onsets 518 or maximum onsets 520) can include a doublet 522 where two consecutive onsets 514 are both either minimum onsets 518 or maximum onsets 510.

In some implementations, a thickness attribute H can be measured for each onset 514 to determine a vertical geometry (shown in FIG. 5 with double end arrows H) and separation from adjacent (e.g., above & below) onsets 514. The thickness H attribute can assist in reducing uncertainty in onset connectivity analyses, which can lead to more accurate horizon patches generation.

In some instances, onset cube 540 can be generated utilizing three types of thickness attributes (i.e., H, H1, and H2) as provided below:

1) H 524 can be a distance value measured along a zero cutoff (e.g., cutoff 512) from an above onset 526 and a below onset 528, along the zero cutoff 512. In some instances, the above onset 526 and the below onset 528 can be adjacent onsets along the zero cutoff 512.

In some cases, seismic trace 510 can include doublets 522 that are two adjacent onsets that can both be minimum onsets 518 or maximum onsets 520. Doublets 522 can also include seismic trace 510 not crossing the zero cutoff 512, in which case, H 530 can be the distance measured between onset 532 (which crosses the zero cutoff 512) and onset 534 (which is the closet onset value to the zero cutoff 512). Onset 534 is shown as a minimum onset in FIG. 5, but a reverse, maximum onset is contemplated in the present disclosure.

2) H1 can be the distance value measured from an above onset 537 and a current onset 536 along the zero cutoff 512. For example, H1 can be a vertical distance along the zero cutoff 512 between minimum onset 537 and current onset 536.

3) H2 can be the distance value measured from current onset 536 and a below onset 538 along the zero cutoff 512. For example, H2 can be a vertical distance along the zero cutoff 512 between current onset 536 and below onset 538.

In some implementations, lines, seismic traces, onset_id, and attributes can be utilized to generate onset volume 540. Furthermore, data structure of onset volume 540 can be a 4D array (e.g., line, seismic trace, onset_id, and attributes). Referring to FIG. 5, FIG. 5 illustrates onset volume 540 in a 3D view. Onset volume 540 can include different shades that can represent and correspond to varying thicknesses H and input seismic data. In some instances, computation of onset volume 540 can be distributed in parallel as each seismic trace 510 can be processed independently. In other instances, computation of onset volume 540 can be performed in sequence based on application.

Figure 6:
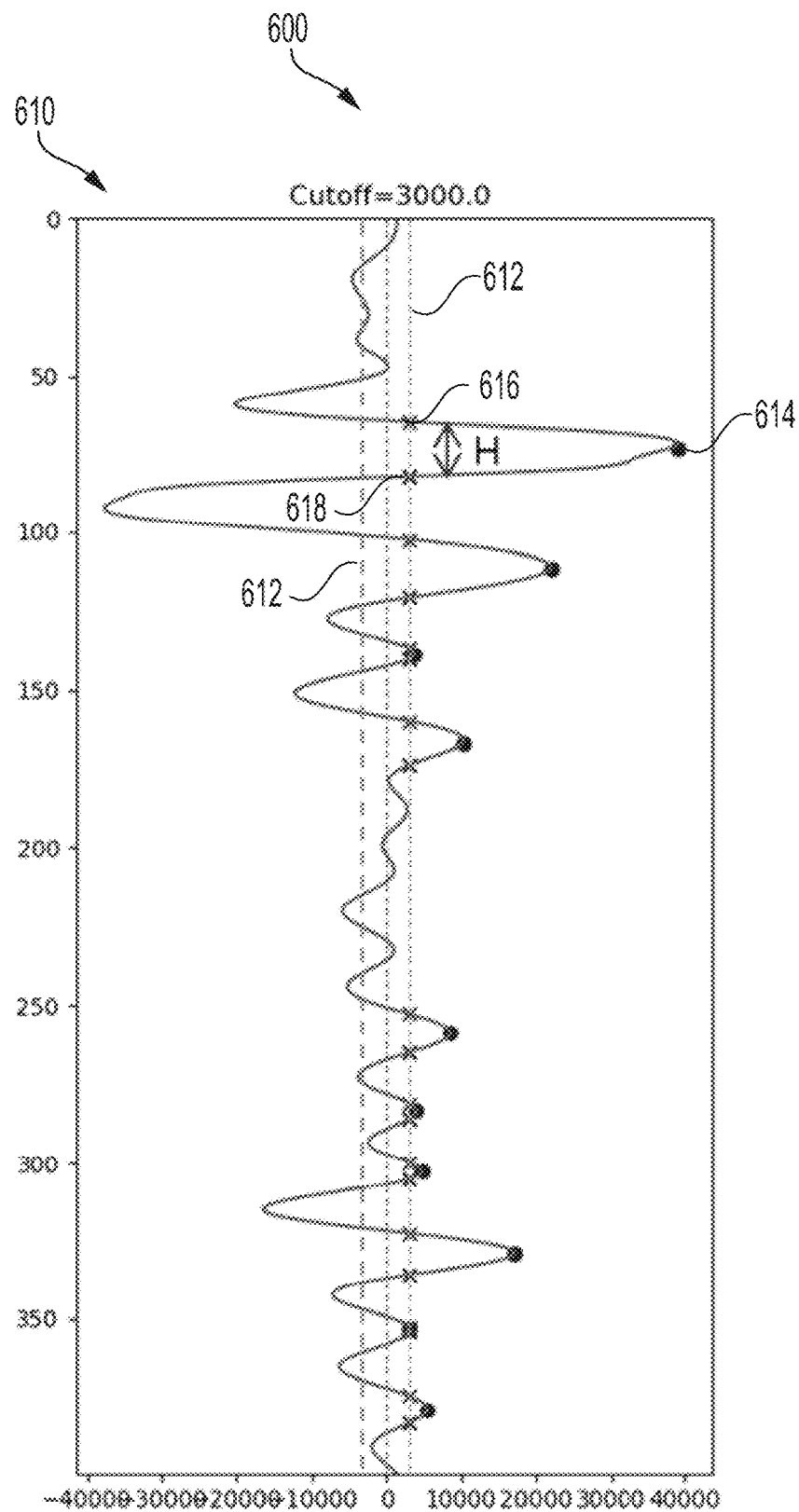
FIG. 6 illustrates an example of onsets based on seismic traces, in accordance with various aspects of the subject technology.

FIG. 6 illustrates an example of onsets 600 based on seismic traces 610, in accordance with various aspects of the subject technology. In some implementations, a user defined amplitude cutoff 612 can be applied in generating an onset volume to avoid the effect of random noise or tracking non-geological extreme low amplitude events. In some instances, a cutoff value can be >=1% of the maximum absolute amplitude observed in the volume.

Referring to FIG. 6, a cutoff value of 3,000 is provided, but other cutoff values are contemplated in the present disclosure. In some implementations, cutoff value may be a positive value such as 3,000 as shown in FIG. 6, or cutoff value may be a negative value such as −3,000.

In some instances, additional logic, as provided below, can be utilized when applying amplitude cutoff 612 in computing an onset volume.

1) Exclude seismic onsets 614 that may have an absolute amplitude<cutoff value 612.

2) Intersections of cutoff value 612 and seismic trace 610 along amplitude cutoff 612 can be computed. For example, FIG. 5 illustrates amplitude cutoff intersections 616, 618 for maximum onsets 614.

3) Thickness H can be the distance measured between above intersection 616 and below intersection 618 along amplitude cutoff 612. For example, above intersection 616 and below intersection 618 occur along cutoff value 3,000.

Figure 7:
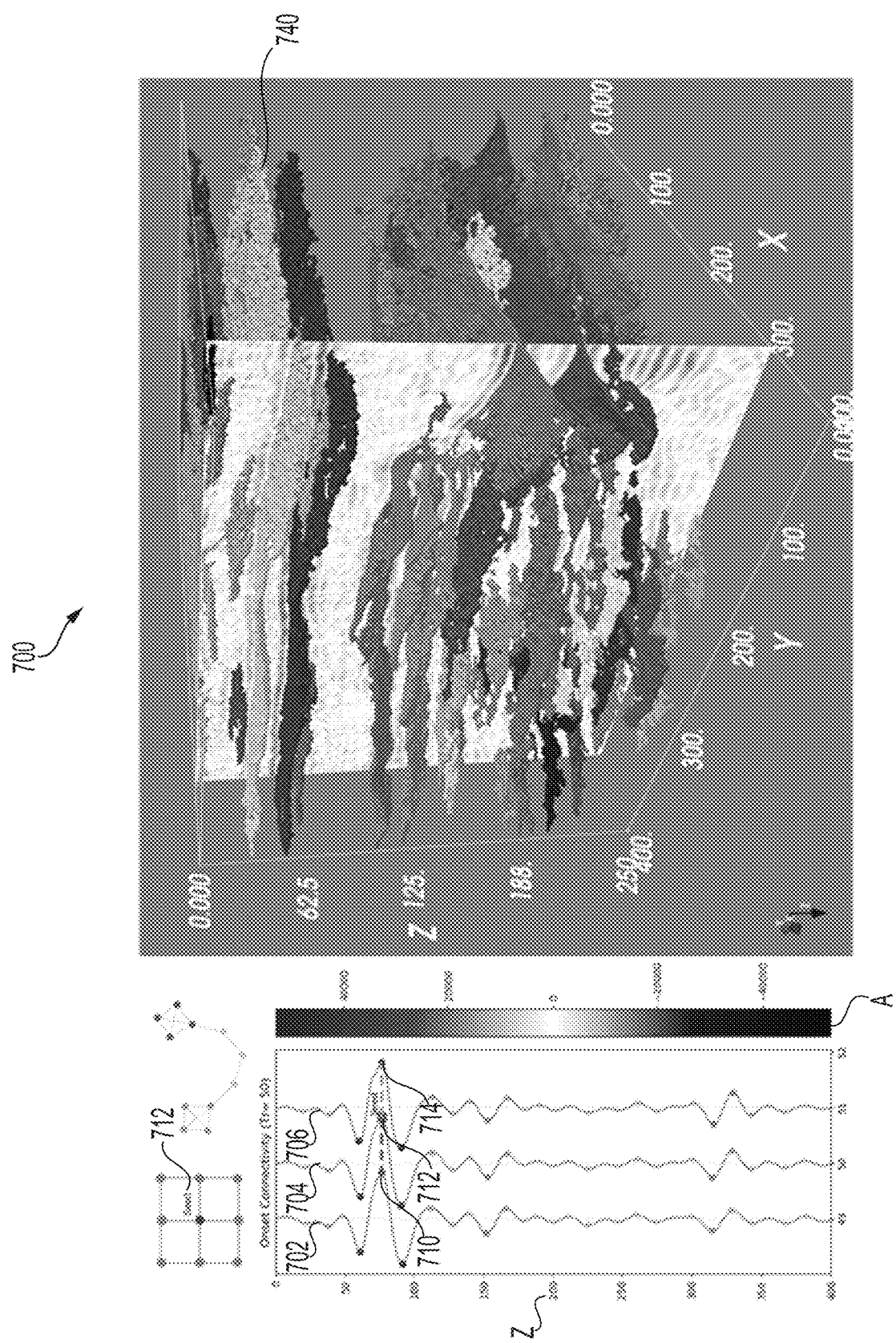
FIG. 7 illustrates an example of connected onsets based on seismic traces, in accordance with various aspects of the subject technology.

FIG. 7 illustrates an example of connected onsets 710, 712, 714 based on seismic traces 702, 704, 706, in accordance with various aspects of the subject technology. For example, onsets 710, 714 (e.g., targets) can be connected to generate a seed 712 (e.g., onset seed). FIG. 6 further illustrates horizon patches 740 generated from analyzing connected onsets 712 within an input volume.

Auto-tracking Horizon Patches:

In some implementations, auto-tracking of horizon patches 740 can be generated by utilizing connectivity analyses of onsets 710, 712, 714 from previously computed onset volumes. Horizon patches 740 can be generated similarly to horizon patches 306 of workflow 300 of FIG. 3B. Trace 710 by trace 714, each onset 710, 714 can be analyzed to determine whether onset 712 (e.g., seed 712) can connect to a targeted onset (e.g., target 710, 714). Neighbor traces 702, 706 can also be considered by comparing respective Z, A, H attributes. In some instances, two onsets 710, 714 can be connected if the difference between their respective attributes (e.g., time Z, amplitude A, and thickness H) satisfy predetermined values such as Z_sc=5-11, A_sc=0.5-0.9, and H_sc=0.5-0.9. The predetermined values can also be set as user defined values. The outcome of the connectivity analysis can include a list of connected onset pairs that can be utilized as inputs for horizon patch 740 generation. For example, if A connects to B and B connects to C, then A, B, and C can belong to the same horizon patch 740.

Connectivity analysis can also be distributed into smaller subsets as each trace 702, 704, 706 can be processed independently or co-dependently. Connectivity analysis can be similar to connectivity analysis 320 of FIGS. 3B, 3E, and 3F. Regardless of which distributed scheme is selected, the connections between two onsets 710, 714 and subsequent horizon patches 740 can be identified consistently.

Figure 9:
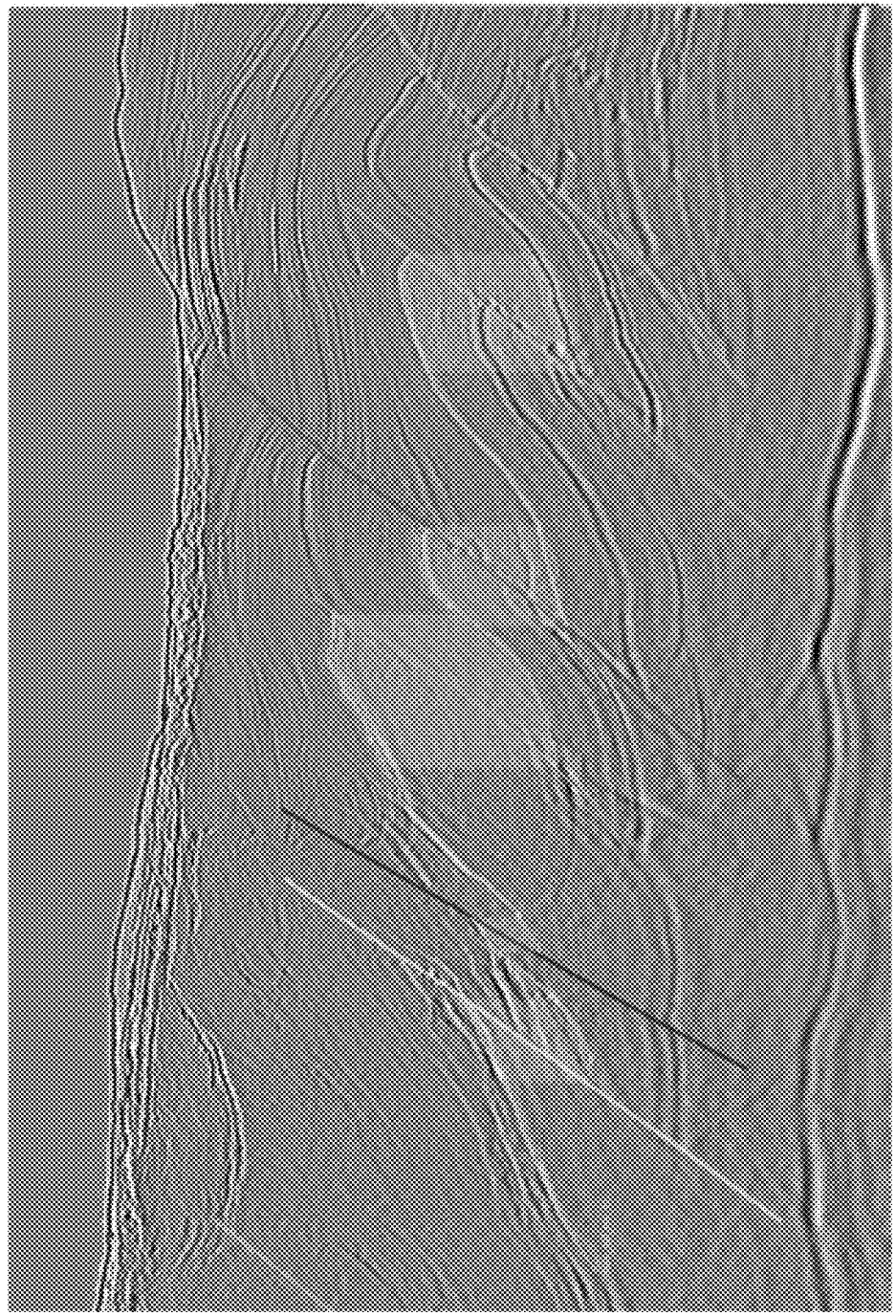
FIG. 9 illustrates an example of a reverse/thrust fault, in accordance with various aspects of the subject technology.
Figure 10:
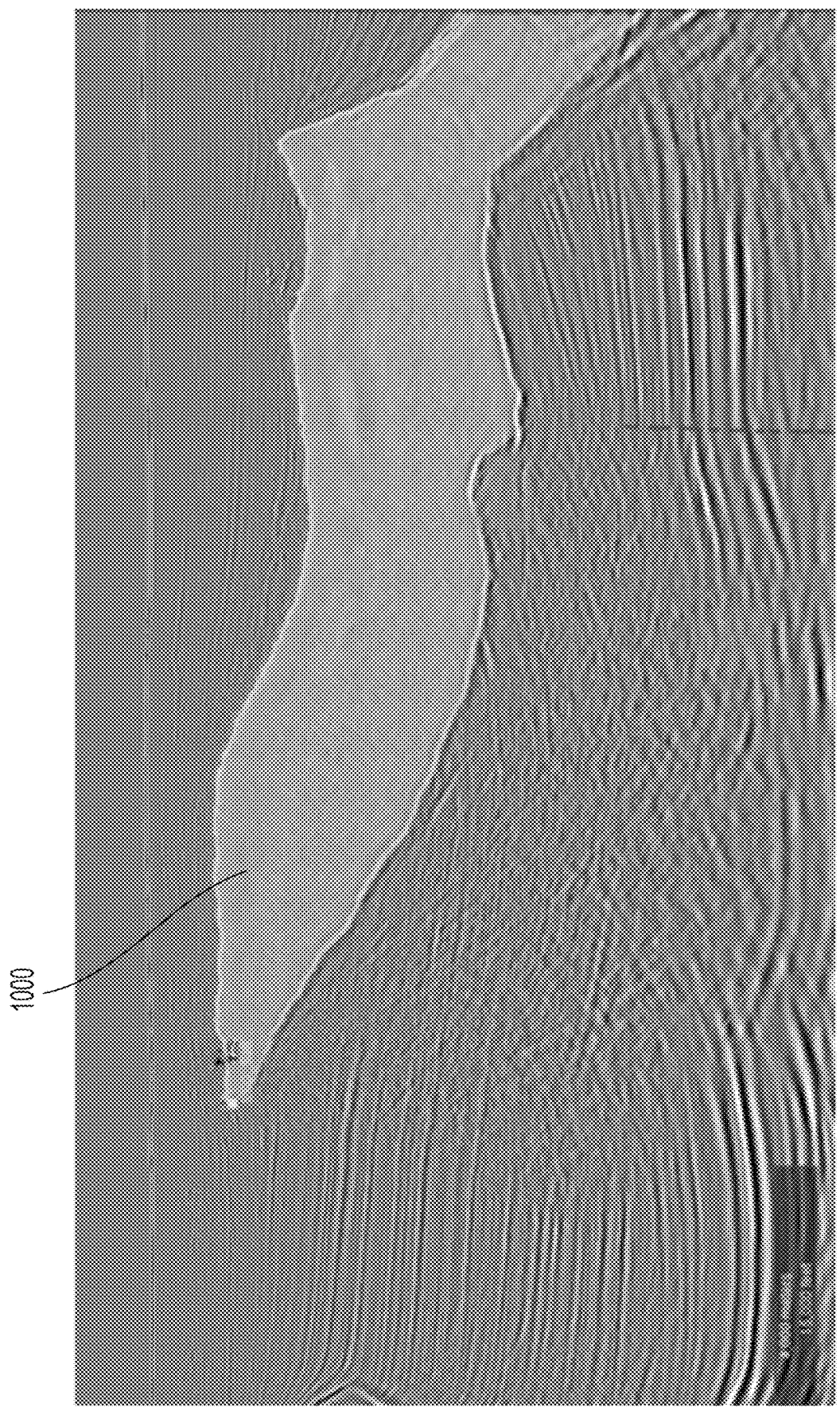
FIG. 10 illustrates an example of a detected salt body, in accordance with various aspects of the subject technology.

In some instances, horizon patches 740 can be generated based on multiple Zs (multi-Z) by utilizing list data structures such as patch_id and a 2D array of attributes including lines, traces, onset_id, Z, A, and H. For example, seed onset 712 can be connected to one or more onsets 710, 714 from neighbor traces 702, 706, if corresponding attribute scores are satisfied. Seed onset 712 and onsets 710, 714 can also be connected to generate a multi-Z horizon patch 740 that can be capture complex subterranean structures including reverse/thrust faults 900 (as shown in FIG. 9) and salt bodies 1000 (as shown in FIG. 10).

In some implementations, a network can include connected seismic onsets 710, 712, 714 from traces 702, 704, 706 within an input volume such as a subterranean surface. Edges can be connections between a pair of onsets 710, 712, 714 that have similar attributes from adjacent traces 702, 704, 706. Components can include connected onsets 710, 712, 714 that can form horizon patches from the connected onsets 710, 712, 714 throughout a volume such as a subterranean surface.

Figure 8:
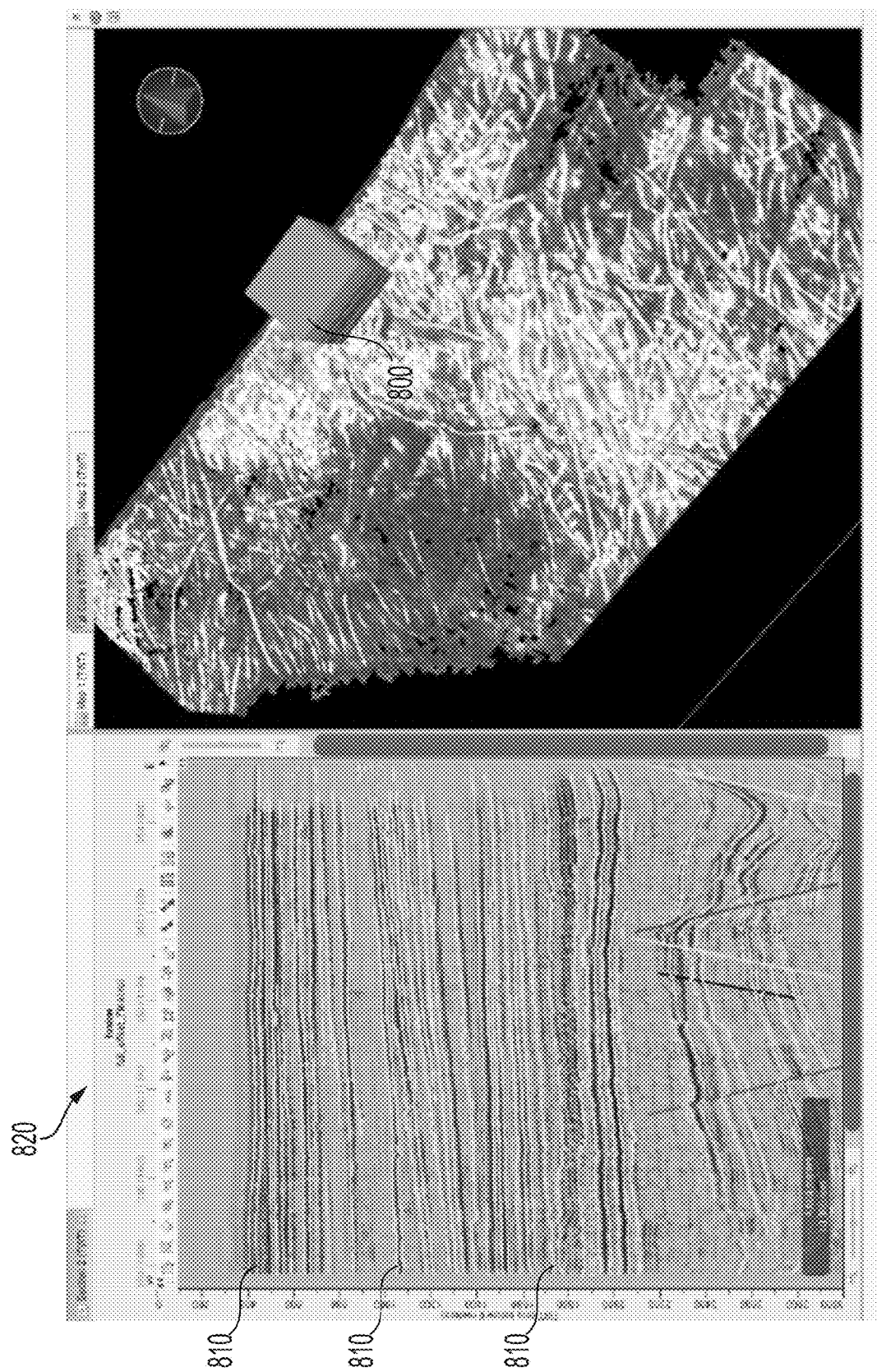
FIG. 8 illustrates an example of a horizon cube, in accordance with various aspects of the subject technology.

FIG. 8 illustrates an example of a horizon cube 800, in accordance with various aspects of the subject technology. In some examples, horizon cube 800 can be ordered by Z mean values (as described herein) that can be displayed in various solids and shades in 2D and 3D views. For example, FIG. 8 illustrates horizon cube 800 in section views 820 and cube 800 colored by amplitude A.

Horizon Cube Generation:

In some implementations, a horizon cube 800 can include a plurality of horizon patches 810 in a logical order. Horizon cube 800 can be generated similarly to horizon cube 308 of workflow 300 of FIG. 3B. For example, horizon patches 810 can be sorted by Z mean values. Horizon cube 800 can also provide a more effective visualization and a correlation from different views in interpretation software.

In some instances, a data structure of horizon cube 800 can include three attributes (e.g., Z, A, and H) with a 3D array (e.g., layer_id, line, and seismic trace). A multi-Z horizon patch 810 can also be converted into multiple layers to store in horizon cube data structure 800. Furthermore, horizon cube 800 can be saved as a multi-Z horizon. Horizon cube 800 can then be displayed as a 3D cube 800 or a 2D section with map views 820. Thereafter, further refinement of horizon cube 800 can be performed interactively using multi-Z horizon layer's manipulation tools such as delete, merge, and re-assignment.

In other instances, thickness measurements H can be computed and utilized along with position (e.g., X, Y, and Z axes) and amplitude A to improve quality of extracting horizon patches 810 from input volumes such as reverse/ thrust faults 900 (as shown in FIG. 9) and salt bodies 1000 (as shown in FIG. 10).

In some examples, horizon patches 810 can further include multi-Z objects. Horizon patches 810 can further capture extents and onsets of seismic events. Computation intensive algorithms can also be utilized in onset volume generation. Connectivity analyses can be processed independently from onset to onset and trace by trace. Thereafter, parallel processing schemes can be applied to the horizon patches.

The present disclosure can apply network/graph theory to seismic trace data to automatically extract horizon patches for seismic events of a seismic volume such as reverse/thrust faults 900 (as shown in FIG. 9) and salt bodies 1000 (as shown in FIG. 10). In some instances, the network can include seismic minimum and maximum onsets from seismic traces within the seismic volume. Edges can be connections between a pair of onsets from the adjacent traces that have similar attributes. The connected components of the network can then be utilized to generate horizon patches of the connected onsets of the seismic volume.

In other implementations, each seismic trace can be represented as a set of minimum and maximum onsets along with attributes such as time/depth Z, amplitude A, sign, and thickness H. Connectivity to neighbor trace onsets can be determined for each trace and onset by comparing their attributes. Additionally, a network/graph of the connected seismic onsets can be generated to extract horizon patches as connected components.

In other instances, an application of network analyses can be utilized to generate full-volume automated horizon patch extractions. For example, seed trace maximum onsets can be connected to adjacent target trace onsets. Horizon patches can then be generated from analyzing the network/graph of all of the connected onsets within an input seismic volume.

Applied network analyses can be applied to individual seismic trace data including parallel-processing to maximize performance of available computing resources from a multi-core computer to the most high-end cloud-computing systems. The extracted horizon patches can be configured to handle multi-Z surfaces to accurately represent complex subterranean structures such as reverse/thrust faults 900 (as shown in FIG. 9) and salt bodies 1000 (as shown in FIG. 10). Furthermore, extracted horizon patches can utilize seismic onsets and capture true amplitude and areal extents of seismic events, which can be utilized for quantitative reservoir characterization studies.

Having disclosed example systems, methods, and technologies for using a real-time predictive analysis to improve monitoring of drilling operations, the disclosure now turns to FIG. 11, which illustrates an example computing device architecture 1100 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 11 illustrates an example computing device architecture 1100 of a computing device which can implement the various technologies and techniques described herein. For example, the computing device architecture 1100 can implement the above-mentioned systems and perform various steps, methods, and techniques disclosed herein. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device, etc. In some instances, multimodal computing devices can enable a user to provide multiple types of input to communicate with the computing device architecture 1100. The communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include services 1132, 1134, 1136 for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A computer-implemented method comprising: receiving seismic trace data of a plurality of seismic events of a subterranean volume; selecting a first seismic trace based on the seismic trace data of the plurality of seismic events, the first seismic trace including a plurality of seismic onsets; determining a depth, an amplitude, and a first thickness of a first seismic onset of the first seismic trace; determining a second thickness between the first seismic onset and a second seismic onset; determining a third thickness between the first seismic onset and a third seismic onset; and generating a horizon patch based on the depth, the amplitude, and the first thickness of the first seismic onset, the second thickness between the first seismic onset and the second seismic onset, and the third thickness between the first seismic onset and the third seismic onset.

Statement 2: A computer-implemented method according to Statement 1, wherein the first seismic onset, the second seismic onset, and the third seismic onset are positioned along an axis.

Statement 3: A computer-implemented method according to any of Statements 1 and 2, wherein the first thickness of the first seismic onset is a distance between an above zero crossing and a below zero crossing of the first seismic onset along the axis. The axis can be a predetermined amplitude cutoff value.

Statement 4: A computer-implemented method according to any of Statements 1 through 3, wherein the second thickness between the first seismic onset and the second seismic onset is a distance between the first seismic onset and the second seismic onset along the axis, and the third thickness between the first seismic onset and the third seismic onset is a distance between the first seismic onset and the third seismic onset along the axis.

Statement 5: A computer-implemented method according to any of Statements 1 through 4, further comprising connecting the first seismic onset of the first seismic trace with a fourth seismic onset of a second seismic trace based on the first thickness, the second thickness, and the third thickness.

Statement 6: A computer-implemented method according to any of Statements 1 through 5, further comprising generating a component based on the connecting of the first seismic onset of the first seismic trace and the fourth seismic onset of the second seismic trace.

Statement 7: A computer-implemented method according to any of Statements 1 through 6, wherein the generating of the horizon patch is further based on the component generated based on the connecting of the first seismic onset of the first seismic trace and the fourth seismic onset of the second seismic trace.

Statement 8: A computer-implemented method according to any of Statements 1 through 7, further comprising utilizing a network analysis technique on the component of the first seismic trace and the second seismic trace to generate the horizon patch.

Statement 9: A system comprising: one or more processors; and at least one computer-readable storage medium having stored therein instructions which, when executed by the one or more processors, cause the system to: receive seismic trace data of a plurality of seismic events of a subterranean volume; select a first seismic trace based on the seismic trace data of the plurality of seismic events, the first seismic trace including a plurality of seismic onsets; determine a depth, an amplitude, and a first thickness of a first seismic onset of the first seismic trace; determine a second thickness between the first seismic onset and a second seismic onset; determine a third thickness between the first seismic onset and a third seismic onset; and generate a horizon patch based on the depth, the amplitude, and the first thickness of the first seismic onset, the second thickness between the first seismic onset and the second seismic onset, and the third thickness between the first seismic onset and the third seismic onset.

Statement 10: A method according to Statement 9, wherein the first seismic onset, the second seismic onset, and the third seismic onset are positioned along an axis.

Statement 11: A method according to any of Statements 9 and 10, wherein the first thickness of the first seismic onset is a distance between an above zero crossing and a below zero crossing of the first seismic onset along the axis. The axis can be a predetermined amplitude cutoff value.

Statement 12: A method according to any of Statements 9 through 11, wherein the second thickness between the first seismic onset and the second seismic onset is a distance between the first seismic onset and the second seismic onset along the axis, and the third thickness between the first seismic onset and the third seismic onset is a distance between the first seismic onset and the third seismic onset along the axis.

Statement 13: A method according to any of Statements 9 through 12, wherein the instructions which, when executed by the one or more processors, cause the system to connect the first seismic onset of the first seismic trace with a fourth seismic onset of a second seismic trace based on the first thickness, the second thickness, and the third thickness.

Statement 14: A method according to any of Statements 9 through 13, wherein the instructions which, when executed by the one or more processors, cause the system to generate a component based on the connection of the first seismic onset of the first seismic trace and the fourth seismic onset of the second seismic trace.

Statement 15: A method according to any of Statements 9 through 14, wherein the generation of the horizon patch is further based on the component generated based on the connection of the first seismic onset of the first seismic trace and the fourth seismic onset of the second seismic trace.

Statement 16: A method according to any of Statements 9 through 15, wherein the instructions which, when executed by the one or more processors, cause the system to utilize a network analysis technique on the component of the first seismic trace and the second seismic trace to generate the horizon patch.

Statement 17: A non-transitory computer-readable storage medium comprising: instructions stored on the non-transitory computer-readable storage medium, the instructions, when executed by one or more processors, cause the one or more processors to: receive seismic trace data of a plurality of seismic events of a subterranean volume; select a first seismic trace based on the seismic trace data of the plurality of seismic events, the first seismic trace including a plurality of seismic onsets; determine a depth, an amplitude, and a first thickness of a first seismic onset of the first seismic trace; determine a second thickness between the first seismic onset and a second seismic onset; determine a third thickness between the first seismic onset and a third seismic onset; and generate a horizon patch based on the depth, the amplitude, and the first thickness of the first seismic onset, the second thickness between the first seismic onset and the second seismic onset, and the third thickness between the first seismic onset and the third seismic onset.

Statement 18: A method according to Statement 17, wherein the instructions, when executed by the one or more processors, cause the one or more processors to connect the first seismic onset of the first seismic trace with a fourth seismic onset of a second seismic trace based on the first thickness, the second thickness, and the third thickness.

Statement 19: A method according to any of Statements 17 and 18, wherein the instructions, when executed by the one or more processors, cause the one or more processors to generate a component based on the connection of the first seismic onset of the first seismic trace and the fourth seismic onset of the second seismic trace.

Statement 20: A method according to any of Statements 17 through 19, wherein the instructions, when executed by the one or more processors, cause the one or more processors to utilize a network analysis technique on the component of the first seismic trace and the second seismic trace to generate the horizon patch.

What is claimed is:

1. A computer-implemented method operable to identify locations of oil and/or gas deposits located subsurface comprising:
    receiving, from a plurality of receivers located along one or more streamers towed by a ship, seismic trace data of a plurality of seismic events of a subterranean volume;
    selecting a first seismic trace based on the seismic trace data of the plurality of seismic events, the first seismic trace including a plurality of seismic onsets;
    determining a depth, an amplitude, and a first thickness of a first seismic onset of the first seismic trace;
    determining a second thickness between the first seismic onset and a second seismic onset;
    determining a third thickness between the first seismic onset and a third seismic onset; and
    generating a horizon patch based on the depth, the amplitude, and the first thickness of the first seismic onset, the second thickness between the first seismic onset and the second seismic onset, and the third thickness between the first seismic onset and the third seismic onset.

2. The computer-implemented method of claim 1, wherein the first seismic onset, the second seismic onset, and the third seismic onset are positioned along an axis.

3. The computer-implemented method of claim 2, wherein the first thickness of the first seismic onset is a distance between an above zero crossing and a below zero crossing of the first seismic onset along the axis.

4. The computer-implemented method of claim 2, wherein the second thickness between the first seismic onset and the second seismic onset is a distance between the first seismic onset and the second seismic onset along the axis, and the third thickness between the first seismic onset and the third seismic onset is a distance between the first seismic onset and the third seismic onset along the axis.

5. The computer-implemented method of claim 1, further comprising connecting the first seismic onset of the first seismic trace with a fourth seismic onset of a second seismic trace based on the first thickness, the second thickness, and the third thickness.

6. The computer-implemented method of claim 5, further comprising generating a component based on the connecting of the first seismic onset of the first seismic trace and the fourth seismic onset of the second seismic trace.

7. The computer-implemented method of claim 6, wherein the generating of the horizon patch is further based on the component generated based on the connecting of the first seismic onset of the first seismic trace and the fourth seismic onset of the second seismic trace.

8. A system operable to identify locations of oil and/or gas deposits located subsurface comprising:
   one or more processors; and
   at least one computer-readable storage medium having stored therein instructions which, when executed by the one or more processors, cause the system to:
      receive, from a plurality of receivers located along one or more streamers towed by a ship, seismic trace data of a plurality of seismic events of a subterranean volume;
      select a first seismic trace based on the seismic trace data of the plurality of seismic events, the first seismic trace including a plurality of seismic onsets;
      determine a depth, an amplitude, and a first thickness of a first seismic onset of the first seismic trace;
      determine a second thickness between the first seismic onset and a second seismic onset;
      determine a third thickness between the first seismic onset and a third seismic onset; and
      generate a horizon patch based on the depth, the amplitude, and the first thickness of the first seismic onset, the second thickness between the first seismic onset and the second seismic onset, and the third thickness between the first seismic onset and the third seismic onset.

9. The system of claim 8, wherein the first seismic onset, the second seismic onset, and the third seismic onset are positioned along an axis.

10. The system of claim 9, wherein the first thickness of the first seismic onset is a distance between an above zero crossing and a below zero crossing of the first seismic onset along the axis.

11. The system of claim 9, wherein the second thickness between the first seismic onset and the second seismic onset is a distance between the first seismic onset and the second seismic onset along the axis, and the third thickness between the first seismic onset and the third seismic onset is a distance between the first seismic onset and the third seismic onset along the axis.

12. The system of claim 8, wherein the instructions which, when executed by the one or more processors, cause the system to connect the first seismic onset of the first seismic trace with a fourth seismic onset of a second seismic trace based on the first thickness, the second thickness, and the third thickness.

13. The system of claim 12, wherein the instructions which, when executed by the one or more processors, cause the system to generate a component based on the connection of the first seismic onset of the first seismic trace and the fourth seismic onset of the second seismic trace.

14. The system of claim 13, wherein the generation of the horizon patch is further based on the component generated based on the connection of the first seismic onset of the first seismic trace and the fourth seismic onset of the second seismic trace.

15. A non-transitory computer-readable storage medium operable to identify locations of oil and/or gas deposits located subsurface comprising:
   instructions stored on the non-transitory computer-readable storage medium, the instructions, when executed by one or more processors, cause the one or more processors to:
      receive, from a plurality of receivers located along one or more streamers towed by a ship, seismic trace data of a plurality of seismic events of a subterranean volume;
      select a first seismic trace based on the seismic trace data of the plurality of seismic events, the first seismic trace including a plurality of seismic onsets;
      determine a depth, an amplitude, and a first thickness of a first seismic onset of the first seismic trace;
      determine a second thickness between the first seismic onset and a second seismic onset;
      determine a third thickness between the first seismic onset and a third seismic onset; and
      generate a horizon patch based on the depth, the amplitude, and the first thickness of the first seismic onset, the second thickness between the first seismic onset and the second seismic onset, and the third thickness between the first seismic onset and the third seismic onset.

16. The non-transitory computer-readable storage medium of claim 15, wherein the instructions, when executed by the one or more processors, cause the one or more processors to connect the first seismic onset of the first seismic trace with a fourth seismic onset of a second seismic trace based on the first thickness, the second thickness, and the third thickness.

17. The non-transitory computer-readable storage medium of claim 16, wherein the instructions, when executed by the one or more processors, cause the one or more processors to generate a component based on the connection of the first seismic onset of the first seismic trace and the fourth seismic onset of the second seismic trace.

\* \* \* \* \*